US009691580B2

(12) United States Patent
von zur Muehlen

(10) Patent No.: US 9,691,580 B2
(45) Date of Patent: Jun. 27, 2017

(54) FUSE HOLDER AND CONFIGURABLE BUS MODULE FOR POWER DISTRIBUTION SYSTEM

(71) Applicant: COOPER TECHNOLOGIES COMPANY, Houston, TX (US)

(72) Inventor: Patrick Alexander von zur Muehlen, Wildwood, MO (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 0 days.

(21) Appl. No.: 14/818,543

(22) Filed: Aug. 5, 2015

(65) Prior Publication Data

US 2017/0040777 A1 Feb. 9, 2017

(51) Int. Cl.
*H02B 1/052* (2006.01)
*H01H 85/20* (2006.01)
*H01R 13/684* (2011.01)
*H01R 31/02* (2006.01)

(52) U.S. Cl.
CPC ...... *H01H 85/203* (2013.01); *H01H 85/2015* (2013.01); *H01R 13/684* (2013.01); *H01R 31/02* (2013.01); *H02B 1/052* (2013.01)

(58) Field of Classification Search
CPC .. H02B 1/052; H01H 85/2015; H01H 85/202; H01H 85/2025; H01H 85/203; H01H 85/2035; H01H 85/204; H01H 85/2045; H01H 2085/2055; H01H 2085/206; H01R 25/145

USPC ........ 361/626, 630, 642, 646, 833, 834, 837
See application file for complete search history.

(56) References Cited

U.S. PATENT DOCUMENTS

| | | | | |
|---|---|---|---|---|
| 4,674,819 A * | 6/1987 | Fujitani | ................ | H01R 12/675 439/404 |
| 5,106,324 A * | 4/1992 | Natsume | ............ | H01H 85/2035 439/510 |
| 6,033,269 A * | 3/2000 | Sekido | ................ | B60R 16/0239 439/796 |
| 6,227,913 B1 * | 5/2001 | Davis | ................ | H02B 1/18 439/620.26 |
| 7,499,262 B1 * | 3/2009 | Darr | ................ | H01R 9/226 361/626 |
| 2001/0051450 A1 * | 12/2001 | Ross | ................ | H01R 4/34 439/78 |
| 2002/0064999 A1 * | 5/2002 | Kobayashi | ......... | H01H 85/0417 439/620.34 |
| 2004/0214473 A1 * | 10/2004 | Maebashi | .......... | H01H 85/2045 439/620.27 |
| 2009/0067122 A1 * | 3/2009 | Darr | ................ | H01R 9/226 361/626 |

* cited by examiner

*Primary Examiner* — Adam B Dravininkas
(74) *Attorney, Agent, or Firm* — Armstrong Teasdale LLP

(57) ABSTRACT

An embodiment of a power distribution system has been disclosed. The power distribution system includes a fuse holder having a plurality of line-side terminals. The power distribution system also includes a bus module having an enclosure and a conductor disposed within the enclosure. The conductor includes a comb-type bus bar having a base member and a plurality of branch members extending from the base member and each embodying a terminal connectable to one of the line-side terminals of the fuse holder.

5 Claims, 8 Drawing Sheets

FUSE HOLDER AND CONFIGURABLE BUS MODULE FOR POWER DISTRIBUTION SYSTEM

BACKGROUND OF THE INVENTION

The field of the invention relates generally to electrical power distribution systems and, more specifically, to fuse holders and bus components therefor.

At least some conventional power distribution systems include a fuse holder in the form of a fuse block with only one line-side terminal and a plurality of load-side terminals. In this manner, the fuse block is configured to supply a plurality of load-side circuits with power from only one line-side circuit. However, this conventional power distribution scheme is undesirable for some applications, and it would be useful to provide a power distribution system with the flexibility to implement various different power distribution schemes.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE INVENTION

Power distribution system constructions and methods of manufacture are set forth below. Such constructions and methods facilitate providing power distribution systems that overcome the disadvantages and problems discussed above.

Notably, while the constructions and methods disclosed below are believed to be particularly useful for extra-low voltage and/or auxiliary power distribution systems, the techniques described below can be extended to low and high voltage, or non-auxiliary, power distribution systems as well. Accordingly, the following description is intended for purposes of illustration rather than limitation. That is, the inventive concepts herein are not necessarily limited to the specific embodiments described below and represented in the Figures.

Figure 1:
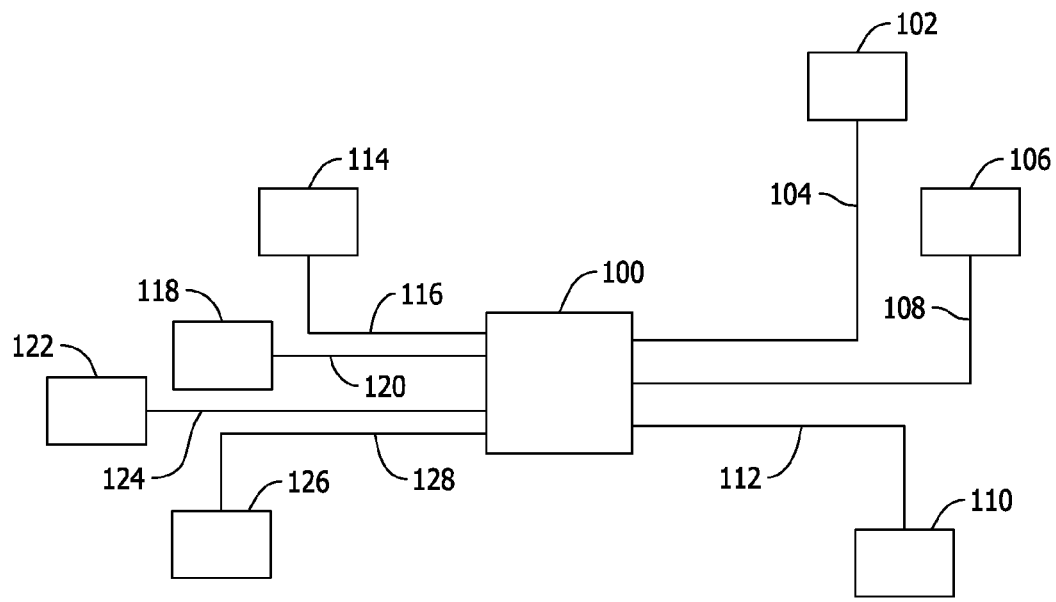
FIG. 1 is a schematic illustration of a power distribution system.

FIG. 1 is a schematic illustration of an embodiment of a power distribution system 100 which facilitates distributing power from at least one line-side circuit (e.g., a first line-side circuit 102 via a first line wire 104, a second line-side circuit 106 via a second line wire 108, and/or a third line-side circuit 110 via a third line wire 112) to at least one load-side circuit (e.g., a first load-side circuit 114 via a first load wire 116, a second load-side circuit 118 via a second load wire 120, a third load-side circuit 122 via a third load wire 124, and/or a fourth load-side circuit 126 via a fourth load wire 128). In accordance with the embodiments set forth below, the power distribution system 100 is configured to allow a user to more easily, effectively, and safely choose between a number of predetermined power distribution schemes (i.e., to choose which one or more of the load-side circuits 114, 118, 122, 126 are to be powered by which one or more of the line-side circuits 102, 106, 110).

In exemplary embodiments, the power distribution system 100 may operate under wide range of operating voltage, and may likewise carry different ranges of current as desired. As current tends to be more of a limiting factor than voltage, the design of the power distribution system 100 as described herein may be optimized for different current ranges with dimensional changes of the conductors and strategic material selection but otherwise in keeping with the concepts described below.

Figure 2:
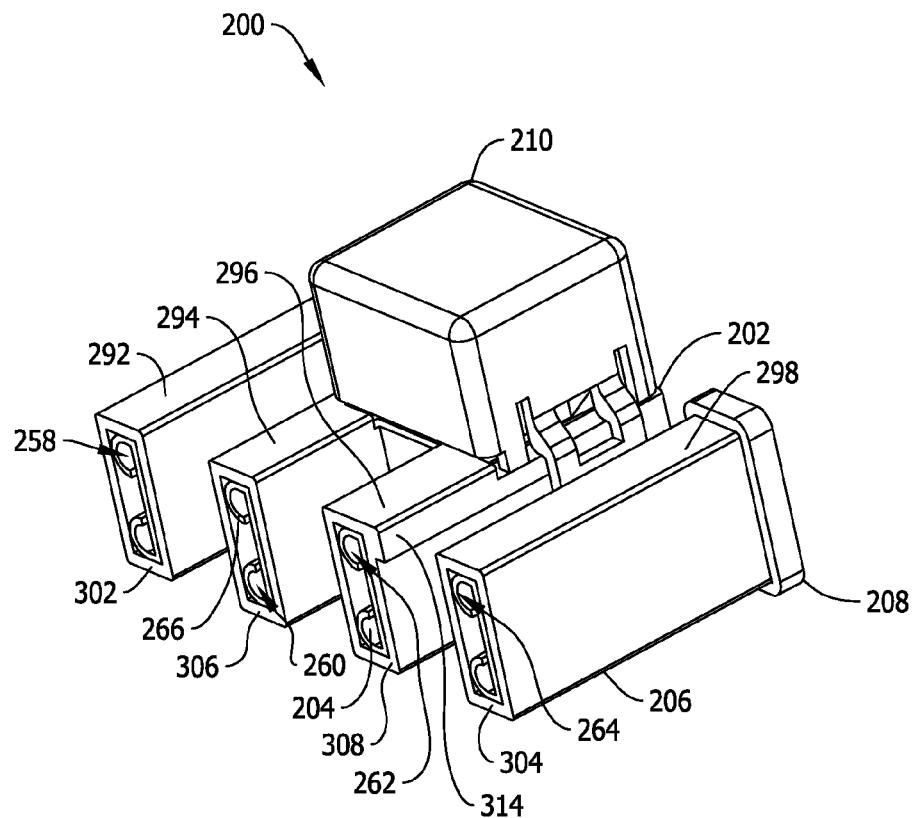
FIG. 2 is a front perspective view of a bus module of the power distribution system shown in FIG. 1.
Figure 3:
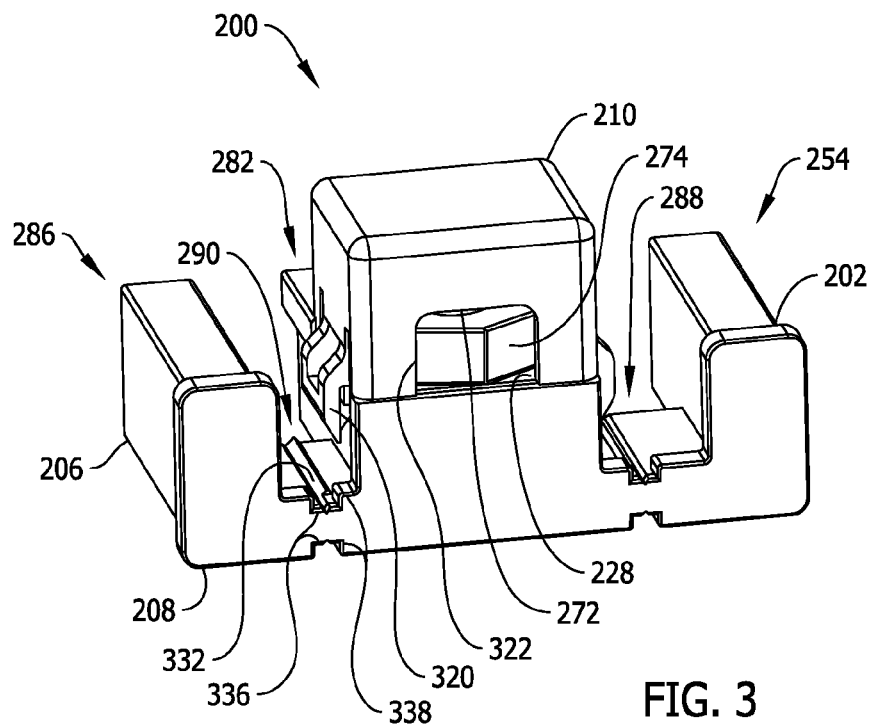
FIG. 3 is a back perspective view of the bus module shown in FIG. 2.
Figure 4:
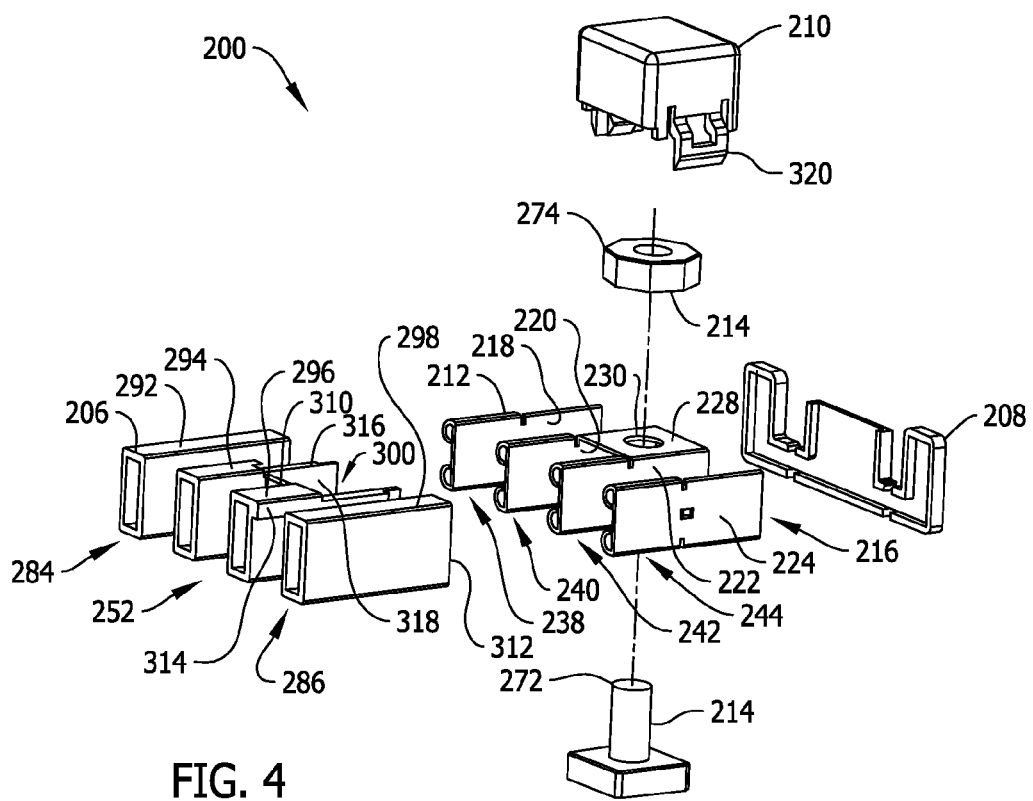
FIG. 4 is an exploded view of the bus module shown in FIG. 2.

FIGS. 2-7 illustrate one embodiment of a bus module 200 of the power distribution system 100. With reference to FIGS. 2-4 in particular, the bus module 200 includes an enclosure 202 and a conductor 204 disposed at least in part within the enclosure 202. The enclosure 202 has a shell 206, a back panel 208 fastened to the shell 206, and a lid 210 detachably mounted on the shell 206. The conductor 204 has a bus bar 212 and a lug connector 214 (broadly a current input terminal) electrically connected to the bus bar 212 (e.g., the current input terminal may be formed integrally with the bus bar 212 in some embodiments, or may be formed separately from and suitably coupled to the bus bar 212 like the illustrated embodiment).

As set forth in more detail below, the illustrated bus module 200 is structurally configured to establish quick connection to, and disconnection from, a fuse holder (e.g., the bus module 200 enables pulling-type disconnection from, and pushing-type connection to, a fuse holder). It is contemplated, however, that other embodiments of the bus module 200 can be configured for use in conjunction with a variety of power distribution system components other than fusible components such as fuse holders.

Figure 6:
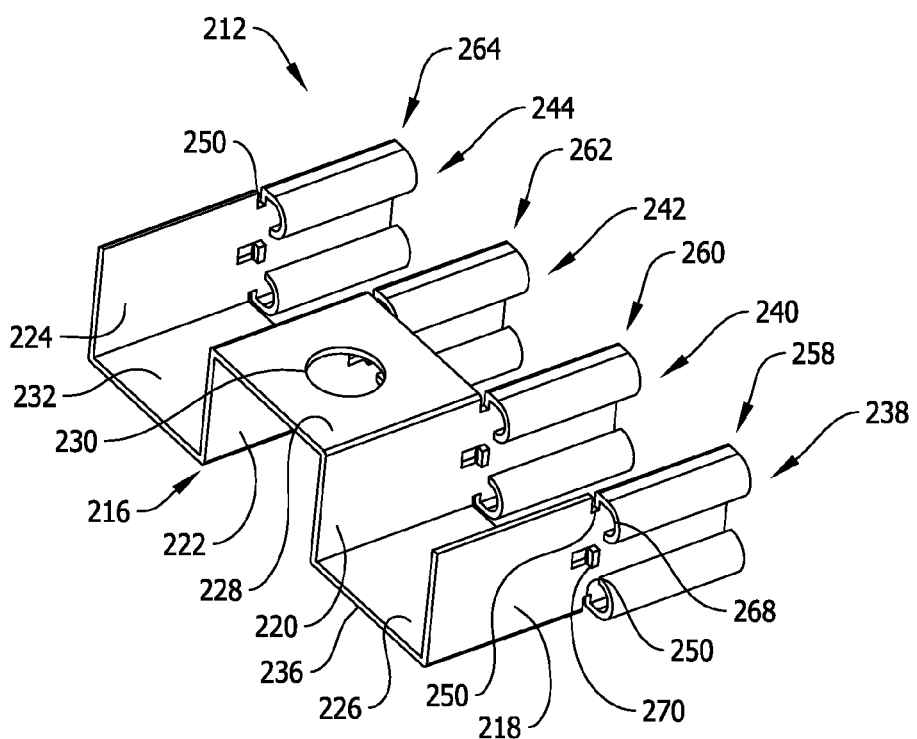
FIG. 6 is a back perspective view of a bus bar of the bus module shown in FIG. 4.
Figure 7:
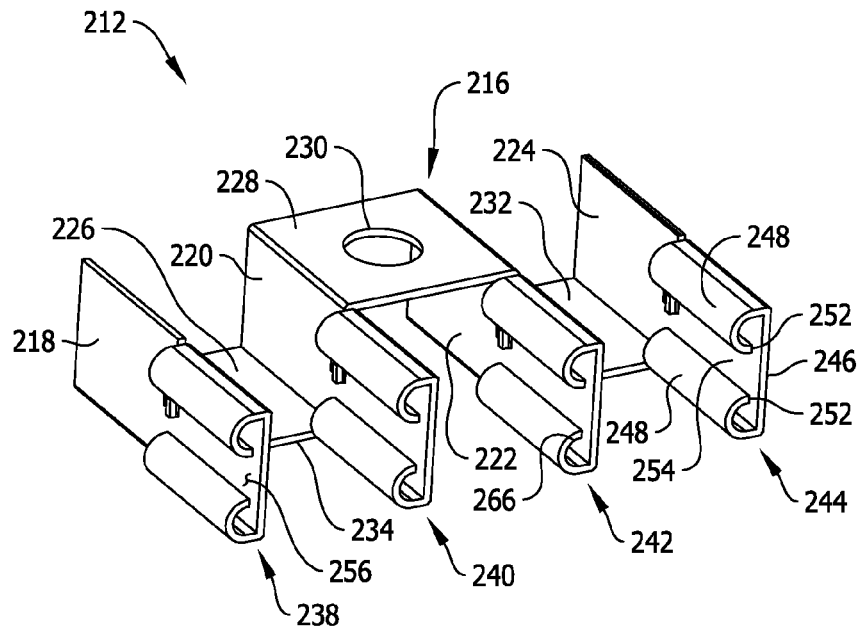
FIG. 7 is a front perspective view of the bus bar shown in FIG. 6.

Referring now to FIGS. 6 and 7, the bus bar 212 is an integrally formed component fabricated by stamping sheet metal to generate a blank and by bending the blank into the illustrated shape. The sheet metal can be made of any suitable material (e.g., a copper, brass, aluminum, alloy, or composite material) and of any suitable thickness to suit any desirable current carrying capacity. Alternatively, the bus bar 212 can be fabricated in any suitable manner (e.g., the bus bar 212 can be fabricated from a plurality of bus bar pieces that are formed separately from one another and are suitably coupled together, by welding or brazing for example).

In the illustrated embodiment, the bus bar 212 is of the comb type and includes a base member 216 with an undulating profile. The base member 216 has a plurality of longitudinal base segments, namely a first longitudinal base segment 218, a second longitudinal base segment 220, a third longitudinal base segment 222, and a fourth longitudinal base segment 224. The longitudinal base segments 218, 220, 222, 224 are spaced apart by a plurality of lateral base segments, namely: a first lower lateral base segment 226 joining the first longitudinal base segment 218 to the second longitudinal base segment 220; an upper lateral base segment 228 defining an aperture 230 and joining the second longitudinal base segment 220 to the third longitudinal base segment 222; and a second lower lateral base segment 232 joining the third longitudinal base segment 222 to the fourth longitudinal base segment 224. The lower lateral base segments 226, 232 are substantially coplanar and are disposed longitudinally below the upper lateral base segment 228 from the illustrated viewpoints, and the upper and lower lateral base segments 226, 228, 232 collectively define a front lateral edge 234 and a back lateral edge 236 of the base member 216.

In addition to the base member 216, the bus bar 212 also includes an array of branch members, namely a first branch member 238, a second branch member 240, a third branch member 242, and a fourth branch member 244. The branch members 238, 240, 242, 244 extend from the front lateral edge 234 of the base member 216 in a unidirectional and substantially parallel manner. More specifically, the first branch member 238 extends from the first longitudinal base segment 218, and the second branch member 240 extends from the second longitudinal base segment 220. Similarly, the third branch member 242 extends from the third longitudinal base segment 222, and the fourth branch member 244 extends from the fourth longitudinal base segment 224. Each of the branch members 238, 240, 242, 244 has a longitudinal branch segment 246 and a pair of arm segments 248. Each arm segment 248 is folded over the longitudinal branch segment 246 at a relief 250 defined near the junction of the respective branch member 238, 240, 242, 244 and the base member 216 such that a distal face 252 of the arm segment 248 is oriented substantially parallel to an inside face 254 of the longitudinal branch segment 246 in spaced relation to define a generally M-shaped slot 256 of the respective branch member 238, 240, 242, 244.

By virtue of each branch member 238, 240, 242, 244 having its own slot 256, the various branch members 238, 240, 242, 244 are each said to embody a female terminal of the bus bar 212. More particularly, the bus bar 212 is said to have a first female terminal 258 embodied by the first branch member 238, a second female terminal 260 embodied by the second branch member 240, a third female terminal 262 embodied by the third branch member 242, and fourth female terminal 264 embodied by the fourth branch member 244. Each of the female terminals 258, 260, 262, 264 has a front opening 266 which is sized to receive a male terminal as set forth in more detail below, and a back opening 268 which is at least partially blocked by a limit stop 270 disposed between the reliefs 250 to facilitate limiting insertion of the male terminal into the respective female terminal 258, 260, 262, 264. Notably, due at least in part to the undulating profile of the base member 216, the female terminals 258, 260, 262, 264 are able to be substantially evenly spaced apart from one another. Alternatively, the bus bar 212 can have any suitable number of female terminals arranged in any suitable manner (e.g., with uneven spacing), or the female terminals of the bus bar 212 can instead be configured as male terminals.

Referring back to FIGS. 2-4, the lug connector 214 of the conductor 204 is configured to connect the bus bar 212 to suitable wiring (e.g., one of the line wires 104, 108, 112 shown in FIG. 1) to facilitate supplying the bus bar 212 with electrical current, as described in more detail below. In the illustrated embodiment, the lug connector 214 includes a bolt 272 (sometimes referred to as a terminal stud) and a nut 274 threaded onto the bolt 272. The bolt 272 is sized for insertion through the aperture 230 of the bus bar 212 from underneath the upper lateral base segment 228 for connection with the nut 274. In this manner, when a wire lug having, for example, a blade terminal (such as a ring or spade terminal) is fitted around the bolt 272, the blade terminal can be clamped between the nut 274 and the upper lateral base segment 228 to electrically connect the wire lug to the lug connector 214 and the bus bar 212. In other embodiments, connectors other than the lug connector 214 described may likewise be utilized as desired. That is, and in another contemplated embodiment, in lieu of the lug connector 214 the conductor 204 may be configured with any suitable structure that facilitates electrically connecting the bus bar 212 to electrical wiring and enabling the bus module 200 to function as described herein. Numerous other variations are possible insofar as establishing electrical connections between the bus bar 212 and external circuitry.

In the illustrated embodiment, the enclosure 202 is fabricated from an electrically and thermally insulating material such as, for example, a rigid plastic material which can optionally be lined with suitable layer(s) of electrically and thermally insulating material (e.g., a compliant (or resilient) material). Moreover, the enclosure 202 is configured to enclose the entire conductor 204 other than the front openings 266 of the female terminals 258, 260, 262, 264 of the bus bar 212 (as shown in FIG. 2), and the upper lateral base segment 228, the bolt 272, and the nut 274 (as shown in FIG. 3). In this manner, when the bus module is electrically connected to a line wire (e.g., the first line wire 104), the bus module 200 is said to be 'touch safe' in the sense that, when handling and using the bus module 200 as directed, a user is protected from the electrical and thermal energy generated by the conductor 204 when the conductor 204 is energized with current supplied by the line wire.

In the illustrated embodiment, the shell 206 of the conductor has a hub region 282 and a pair of flank regions each on opposite sides of the hub region 282, namely a left flank region 284 on the left side of the hub region 282 and a right flank region 286 on the right side of the hub region 282 when the shell 206 is viewed from the perspective of FIG. 4. The left flank region 284 is connected to the hub region 282 across a first web region 288, and the right flank region 286 is connected to the hub region 282 across a second web region 290.

Referring in particular to FIGS. 2 and 4, the illustrated shell 206 has a plurality of sleeves, namely a first sleeve 292 defined in the left flank region 284, second and third sleeves 294, 296 defined in the hub region 282, and a fourth sleeve 298 defined in the right flank region 286. The shell 206 also has a hub compartment 300 defined in the hub region 282 behind the second and third sleeves 294, 296. The first sleeve 292 receives the first branch member 238 and the first longitudinal base segment 218 of the base member 216 such that the first female terminal 258 is accessible through an open front face 302 of the first sleeve 292. The fourth sleeve 298 receives the fourth branch member 244 and the fourth longitudinal base segment 224 of the base member 216 such that the fourth female terminal 264 is accessible through an open front face 304 of the fourth sleeve 298. The second and third sleeves 294, 296 receive the second and third branch members 240, 242 of the base member 216, respectively, such that the second female terminal 260 and the third female terminal 262 are accessible through an open front face 306 of the second sleeve 294 and an open front face 308 of the third sleeve 296, respectively. The second longitudinal base segment 220, the third longitudinal base segment 222, and the upper lateral base segment 228 of the base member 216 are, therefore, disposed in the hub compartment 300 such that the nut 274 is accessible through an open top face 310 of the hub compartment 300. Moreover, the first lower lateral base segment 226 of the base member 216 is disposed within the first web region 288, and the second lower lateral base segment 232 is disposed within the second web region 290. In this manner, the conductor 204 is contained within the shell 206 by the back panel 208, which is permanently coupled to an open back face 312 of the shell 206 via a suitable bonding method (e.g., an adhesive bond, ultrasonic weld, etc.).

Notably, in other embodiments, the quantity sleeves in the shell 206 is selectable to suit the quantity of female terminals on the bus bar 212 housed within the shell 206. Hence, while the shell 206 of the illustrated embodiment has four sleeves 292, 294, 296, 298 to suit the four female terminals 258, 260, 262, 264 on the bus bar 212, it is contemplated that some embodiments of the shell 206 can have any quantity of sleeves to suit any quantity of female terminals on the bus bar 212. For example, it is contemplated that one embodiment of the shell 206 can have eight sleeves to suit eight female terminals on the bus bar 212, or another embodiment of the shell 206 can have sixteen sleeves to suit sixteen female terminals on the bus bar 212. Moreover, in other embodiments, the sleeves of the shell 206 can be allocated in any suitable manner amongst the flank regions 284, 286 and the hub region 282 (i.e., one embodiment of the shell 206 can have two sleeves in the left flank region 284, one sleeve in the hub region 282, and two sleeves in the right flank region 286; or, another embodiment of the shell 206 can have one sleeve in the left flank region 284, one sleeve in the hub region 282, and three sleeves in the right flank region 286; or, the shell 206 can have only one flank region in which one or more sleeves are disposed, such that the hub region 282 is not centrally located between a pair of flank regions).

In the illustrated embodiment, the hub region 282 of the shell 206 has a pair of rails 314 each formed near an upper edge 316 of a longitudinal wall 318 which defines part of the hub compartment 300. Conveniently, the lid 210 has a pair of flexible clips 320 for engaging the rails 314 such that the lid 210 is configured for covering the nut 274 of the lug connector 214 in a manner that permits manual pulling (or snap-off) disengagement and pushing (or snap-on) engagement of the lid 210 with the shell 206. Notably, the lid 210 has a backside opening 322 which permits wire access to the lug connector 214 for electrically connecting a wire lug to the lug connector 214 as set forth above. Alternatively, the lid 210 can be configured in any suitable manner that facilitates enabling the lid 210 to function as described herein.

Figure 5:
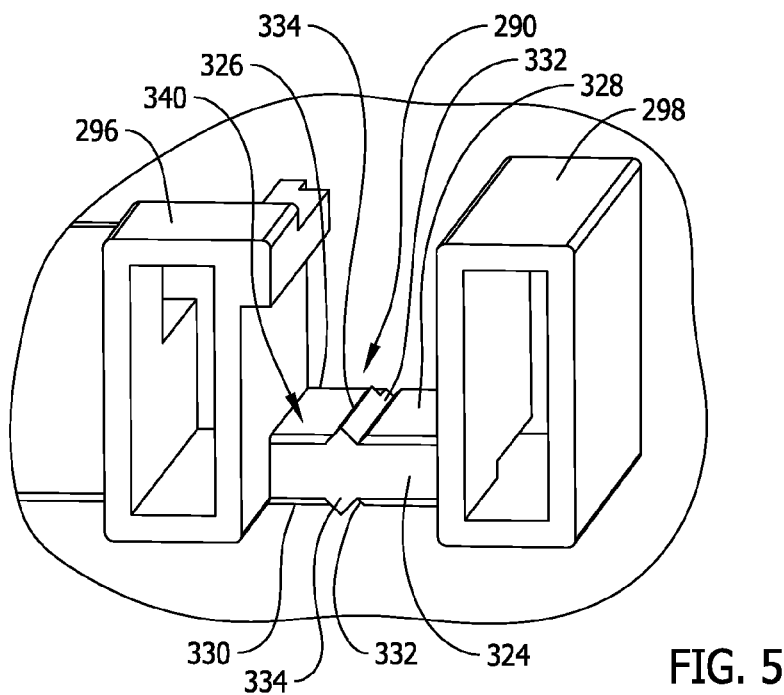
FIG. 5 is an enlarged front perspective view of a web region of a shell of the bus module shown in FIG. 4.

As shown in FIG. 5, each of the web regions 288, 290 has front face 324, a back face 326, a top face 328, and a bottom face 330. A groove 332 and a rib 334 are defined in each of the top and bottom faces 328, 330, such that the grooves 332 of each web region 288, 290 are opposingly aligned with one another and such that the ribs 334 of each web region 288, 290 are also opposingly aligned with one another. Referring also now to FIG. 3, each groove 332 extends from the front face 324 to the back face 326 of the respective web region 288, 290 in alignment with a notch 336 defined in the back panel 208, with each groove 332 being oriented substantially parallel to its nearest sleeve 294, 296 of the hub region 282. Each of the ribs 334 is situated between its respective groove 332 and the nearest sleeve 294, 296 of the hub region 282, and each of the ribs 334 extends from the front face 324 of the respective web region 288, 290 toward a tab 338 of the back panel 208 in substantially parallel orientation with the respective groove 332. In this manner, each of the top and bottom faces 328, 330 of each web region 288, 290 has a hub-side segment 340 disposed between its respective rib 334 and the hub region 282.

Figure 8:
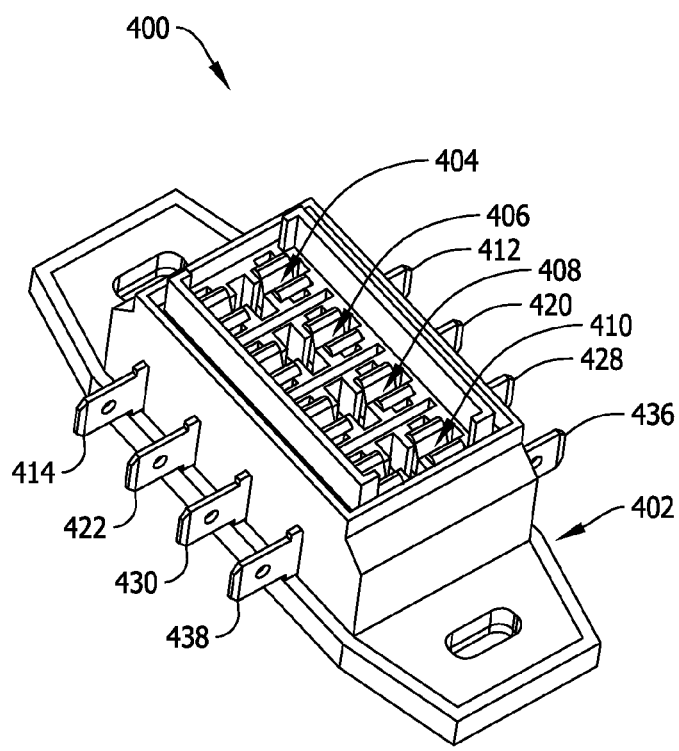
FIG. 8 is a perspective view of a fuse holder of the power distribution system shown in FIG. 1.
Figure 9:
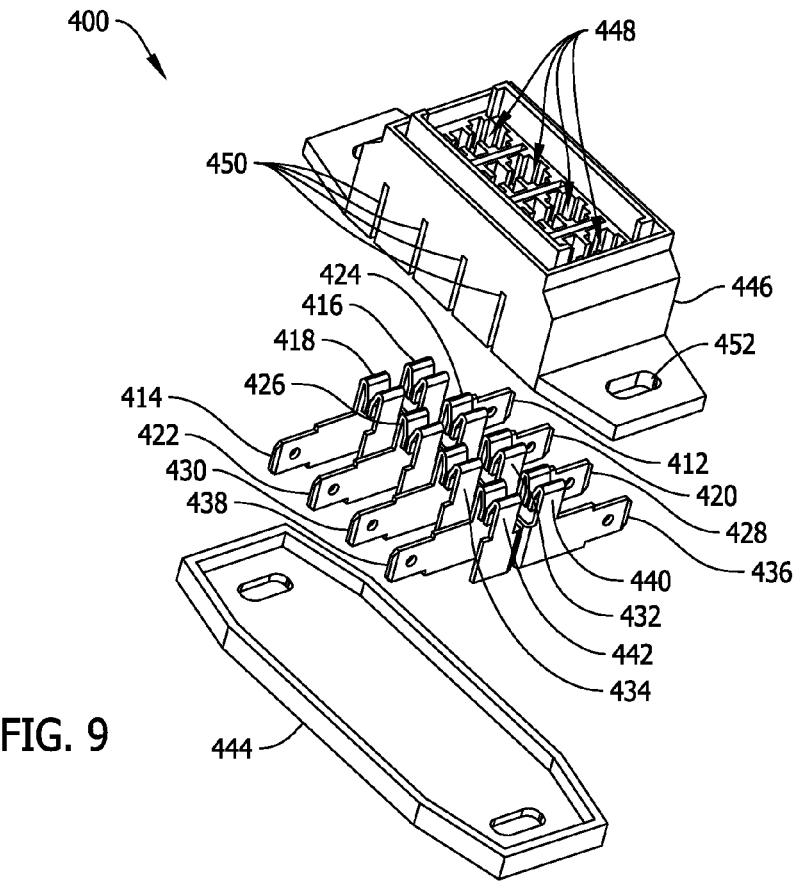
FIG. 9 is an exploded view of the fuse holder shown in FIG. 8.

FIGS. 8 and 9 illustrate an embodiment of a fuse holder 400 of the power distribution system 100. In the illustrated embodiment, the fuse holder 400 includes a housing 402 and a plurality of fuse sockets mounted in the housing 402, namely a first fuse socket 404, a second fuse socket 406, a third fuse socket 408, and a fourth fuse socket 410. Notably, the fuse sockets 404, 406, 408, 410 of the illustrated embodiment are sized to receive lower ampacity, automotive-type fuses. However, it is contemplated that the fuse sockets of other embodiments can be configured to receive any suitable type of fuse such as, for example, higher ampacity fuses that are not of the automotive type. Moreover, while the illustrated fuse holder 400 has four such fuse sockets, alternative embodiments of the fuse holder 400 can have any suitable number of fuse sockets (e.g., eight or sixteen fuse sockets).

In the illustrated embodiment, the first fuse socket 404 has a first male, line-side terminal 412 and a first male, load-side terminal 414 configured for electrical connection to one another across a first fuse (not shown) when the blades of the first fuse are inserted into line-side and load-side clips 416, 418 of the first fuse socket 404. The second fuse socket 406 has a second male, line-side terminal 420 and a second male, load-side terminal 422 configured for electrical connection to one another across a second fuse (not shown) when the blades of the second fuse are inserted into line-side and load-side clips 424, 426 of the second fuse socket 406. The third fuse socket 408 has a third male, line-side terminal 428 and a third male, load-side terminal 430 configured for electrical connection to one another across a third fuse (not shown) when the blades of the third fuse are inserted into line-side and load-side clips 432, 434 of the third fuse socket 408. The fourth fuse socket 410 has a fourth male, line-side terminal 436 and a fourth male, load-side terminal 438 configured for electrical connection to one another across a fourth fuse (not shown) when the blades of the fourth fuse are inserted into line-side and load-side clips 440, 442 of the fourth fuse socket 410. It is contemplated that, in other embodiments, each fuse socket of the fuse holder 400 can have any suitable arrangement of clips (or other fuse connection mechanisms), and any suitable arrangement of terminals, configured in any suitable manner (e.g., the male, line-side terminals 412, 420, 428, 436 and/or the male, load-side terminals 414, 422, 430, 438 can instead be provided as female terminals, or any other suitable type of terminals).

The illustrated housing 402 has a base plate 444 and a cover 446 mounted on the base plate 444 to define an interior space of the housing 402 in which the fuse sockets 404, 406, 408, 410 are contained. The cover 446 has a plurality of slots 448 which are configured to receive and support the clips

416, 418, 424, 426, 432, 434, 440, 442 of the various fuse sockets 404, 406, 408, 410 such that the fuse sockets 404, 406, 408, 410 are arranged in parallel with one another and such that the clips 416, 418, 424, 426, 432, 434, 440, 442 of each respective fuse socket 404, 406, 408, 410 are accessible to permit insertion of a fuse therein. Additionally, the cover 446 has a plurality of slits 450 which receive and support the various male terminals 412, 414, 420, 422, 428, 430, 436, 438 such that the male terminals 412, 414, 420, 422, 428, 430, 436, 438 are accessible for electrical connection to associated circuitry (e.g., line-side circuit(s) 102, 106, 110 and load-side circuit(s) 114, 118, 122, 126 in the manner set forth in more detail below). Suitably, the housing 402 (e.g., the base plate 444) also has at least one hole 452 sized to receive a fastener (e.g., a bolt or a screw) for mounting the fuse holder 400 to a suitable structure such as, for example, the frame of an automobile.

With reference now to FIGS. 1 and 8, any one or more of the load-side circuits 114, 118, 122, 126 can be connected to the fuse holder 400 for being supplied power across any one or more of the fuses carried by the fuse holder 400. In the various power distribution schemes used as examples below, the load-side circuits 114, 118, 122, 126 are each connected to a respective one of the load-side terminals 414, 422, 430, 438 of the fuse holder 400 by suitable connection of the associated load wires 116, 120, 124, 128 thereto (e.g., the first load-side circuit 114 is connected to the first load-side terminal 414 via the first load wire 116, the second load-side circuit 118 is connected to the second load-side terminal 422 via the second load wire 120, the third load-side circuit 122 is connected to the third load-side terminal 430 via the third load wire 124, and the fourth load-side circuit 126 is connected to the fourth load-side terminal 438 via the fourth load wire 128). In this manner, each of the load-side circuits 114, 118, 122, 126 has its own dedicated fuse which is carried in the respective fuse socket 404, 406, 408, 410 of the fuse holder 400. It is also contemplated that, for some power distribution schemes aside from the exemplary ones provided below, the fuse holder 400 can be used without all of its load-side terminals 414, 422, 430, 438 occupied by a respective load-side circuit (e.g., one or more of the load-side terminals 414, 422, 430, 438 can be left unoccupied, and the fuse module 200 can be configured accordingly, such that the unoccupied load-side terminal(s) 414, 422, 430, 438 remain de-energized during use of the power distribution system 100).

Turning now to the bus module 200 with particular reference again to FIGS. 1-4, a user can electrically connect the first line wire 104 to the lug connector 214 of the bus bar 212 by snapping the lid 210 off of the rails 314 of the shell 206 and clamping a wire lug (e.g., a blade terminal) of the first line wire 104 between the nut 274 and the upper lateral base segment 228 around the bolt 272. After connecting the first line wire 104 to the lug connector 214, the lid 210 can be snapped back onto to the rails 314 such that the first line wire 104 passes through the backside opening 322 of the lid 210, effectively utilizing the lid 210 to shield the electrical connection between the first line wire 104 and the lug connector 214 from contact by a user and from exposure to environmental concerns such as, for example, moisture and dust. However, prior to electrically connecting the bus module 200 to the first line wire 104 as described, a user needs to first decide which configuration of the bus module 200 best suits his/her desired power distribution scheme. Set forth below are just a few of the many power distribution schemes made possible by the adaptable nature of the bus module 200.

Figure 10:
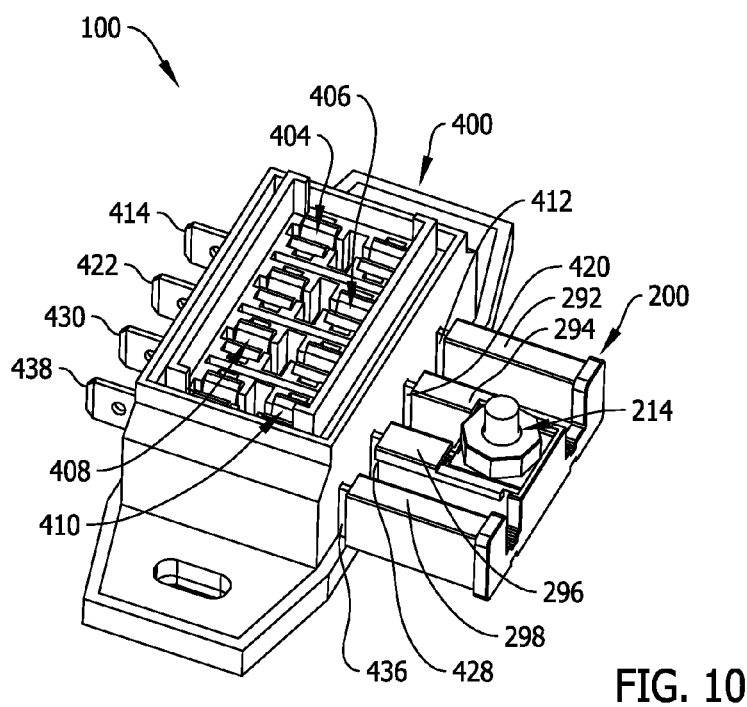
FIG. 10 is a perspective view of the bus module shown in FIG. 2 connected to the fuse holder shown in FIG. 8.

Referring now to FIGS. 1, 2, and 10, using the illustrated configuration of the bus module 200 (hereinafter referred to as the standard configuration of the bus module 200), the user can implement a first power distribution scheme in which all of the load-side circuits 114, 118, 122, 126 are powered using the first line-side circuit 102. The user first connects the bus module 200 to the first line wire 104 in the manner set forth above, and then the user simply inserts each of the male, line-side terminals 412, 420, 428, 436 of the fuse holder 400 into the front opening 266 of a respective one of the female terminals 258, 260, 262, 264 of bus module 200.

More specifically, the first power distribution scheme is implemented by connecting the bus module 200 in its standard configuration to the fuse holder 400 in the following manner: the first male, line-side terminal 412 of the fuse holder 400 is inserted into the first female terminal 258 within the first sleeve 292 of the bus module 200 for electrical connection thereto; the second male, line-side terminal 420 of the fuse holder 400 is inserted into the second female terminal 260 within the second sleeve 294 of the bus module 200 for electrical connection thereto; the third male, line-side terminal 428 of the fuse holder 400 is inserted into the third female terminal 262 within the third sleeve 296 of the bus module 200 for electrical connection thereto; and the fourth male, line-side terminal 436 of the fuse holder 400 is inserted into the fourth female terminal 264 within the fourth sleeve 298 of the bus module 200 for electrical connection thereto. Power from the first line-side circuit 102 can then be supplied to all of the load-side circuits 114, 118, 122, 126 via their respective load-side terminals 414, 422, 430, 438 and load wires 116, 120, 124, 128 such that each of the load-side circuits 114, 118, 122, 126 is protected from overcurrent by a fuse carried in each of the respective fuse sockets 404, 406, 408, 410 of the fuse holder 400.

If, on the other hand, the user converts the bus module 200 from its standard configuration into a first modified configuration, the user can instead implement a second power distribution scheme in which the first, second, and third load-side circuits 114, 118, 122 are powered by the first line-side circuit 102, while the fourth load-side circuit 126 is powered by the second-line side circuit 106.

Figure 14:
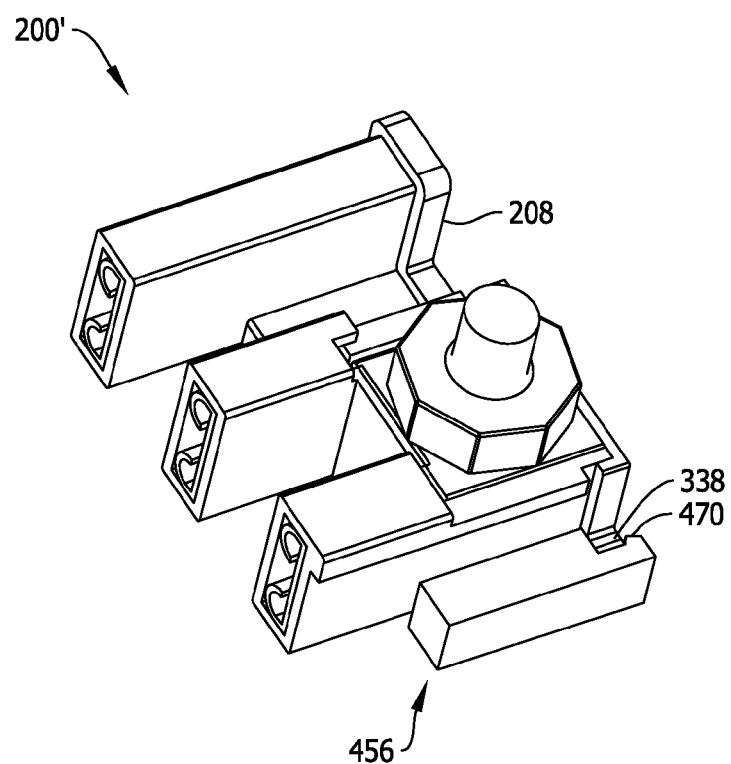
FIG. 14 is a perspective view of the cap shown in FIG. 13 attached to the bus module shown in FIG. 11 to form a modified bus module.

With reference briefly to FIG. 3, the bus module 200 can be easily converted into its first modified configuration (which is shown in FIG. 14) by simply detaching the right flank region 286 from the hub region 282 at the second web region 290 using a cutting device such as, for example, a suitable pair of shears. Providing assistance to the user in detaching the right flank region 286 are the grooves 332 of the second web region 290 and the notches 336 of the back panel 208, which serve as a cutting device alignment feature and as a thinner (or weakened) area through which the cutting device can more easily move. In contemplated embodiments also, the thinner or weakened area may also be structured to allow a snap off-type of detachment without necessarily utilizing a cutting tool.

Figure 11:
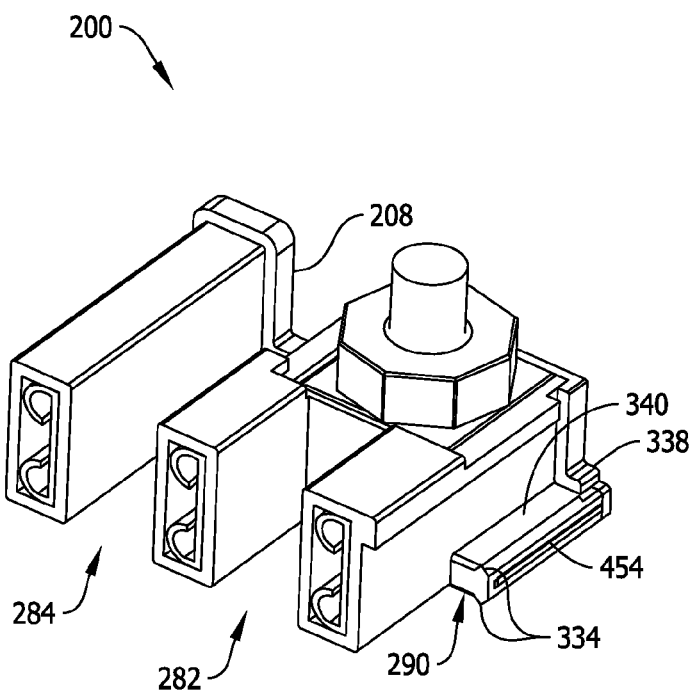
FIG. 11 is a front perspective view of the bus module shown in FIG. 2 after a terminal of the bus module has been detached to suit a different power distribution scheme.
Figure 12:
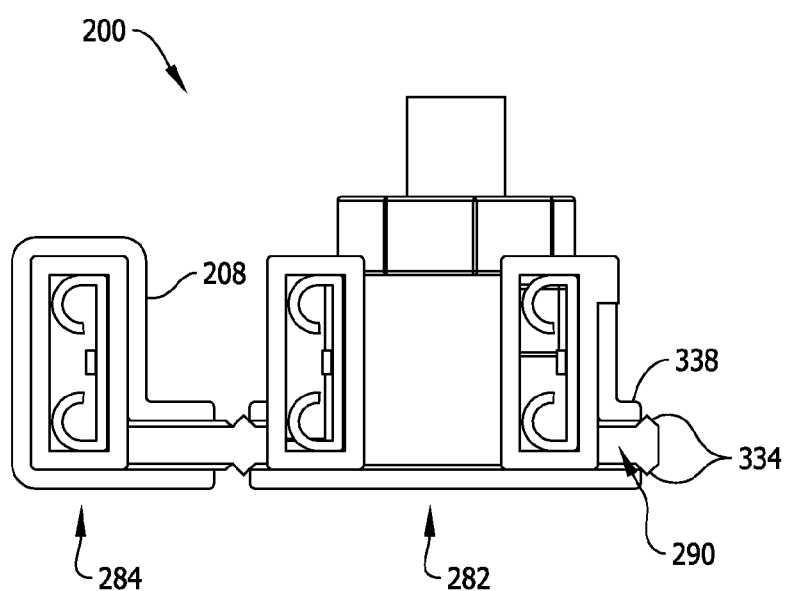
FIG. 12 is a front view of the bus module shown in FIG. 11.
Figure 13:
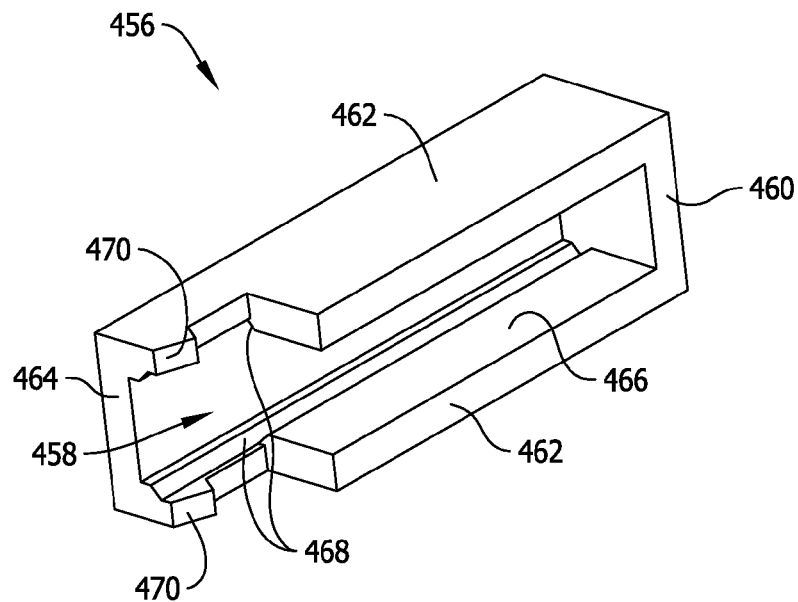
FIG. 13 is a perspective view of a cap for use on the bus module shown in FIG. 11.

Turning to FIGS. 11 and 12, by detaching the right flank region 286 from the hub region 282 at the second web region 290 in this manner, the second lower lateral base segment 232 of the conductor 204 is cut and becomes exposed at its cut end 454. As shown in FIG. 13, the bus module 200 is provided with a cap 456 that can facilitate shielding the cut end 454 of the second lower lateral base segment 232 from contact by the user and from exposure to environmental concerns (e.g., moisture, dust, etc.). The illustrated cap 456 has an open end 458, a closed end (or end wall 460), and a pair of opposed guide walls 462 extending from the open end 458 to the end wall 460 such that a shield wall 464 extends between the guide walls 462. Each of the guide walls 462 has an interior surface 466 which defines a channel 468 that extends from the open end 458 toward the end wall 460, and each of the guide walls 462 also has a detent 470 formed at the open end 458.

With reference collectively to FIGS. 11-14, the cap 456 can be attached to the hub-side segment 340 of the second web region 290 by sliding each of the ribs 334 into and along one of the channels 468 through the open end 458 until the detents 470 flexibly clip onto the tabs 338 of the back panel 208. With the cap 456 attached to the hub-side segment 340 of the second web region 290 in this manner, the bus module 200 is said to be in its first modified configuration (referred to below as the modified bus module 200'). Suitably, the user can now discard the detached right flank region 286 in the appropriate manner, given that the detached right flank region 286 is no longer useful in the power distribution system 100.

Figure 15:
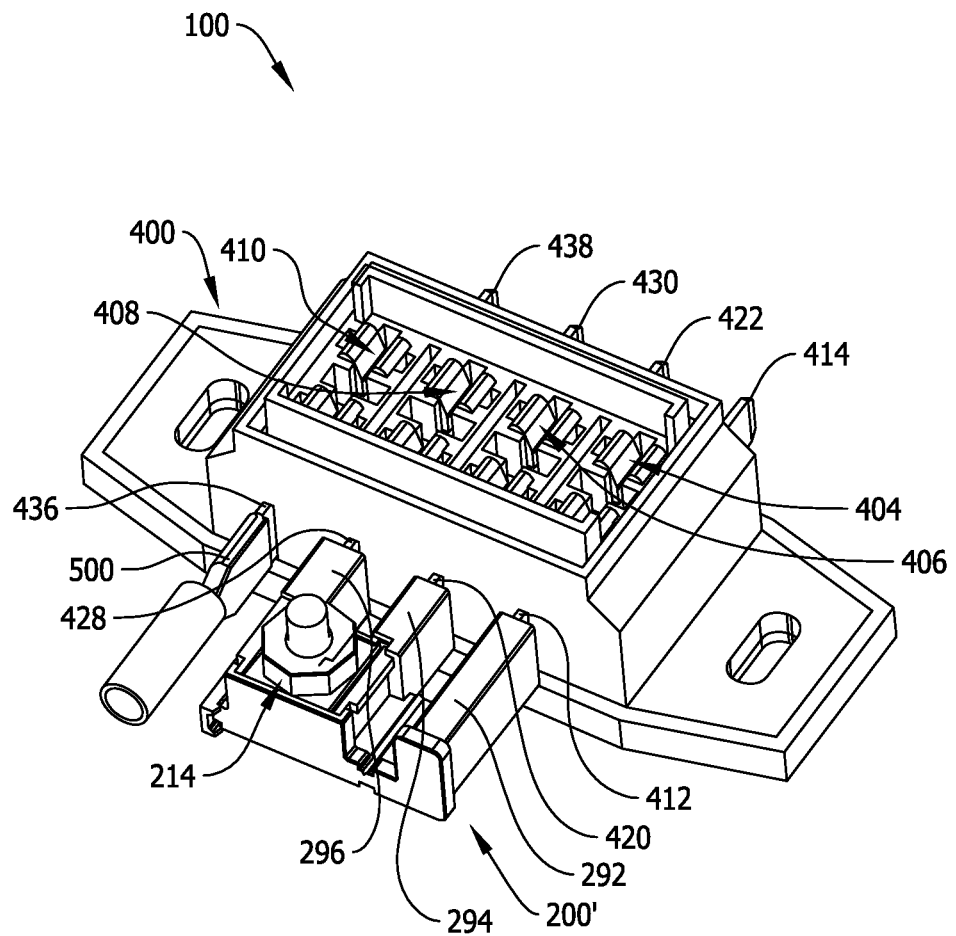
FIG. 15 is a perspective view of the modified bus module shown in FIG. 14 connected to the fuse holder shown in FIG. 8.

Referring now to FIGS. 1 and 15, to implement the second power distribution scheme using the modified bus module 200', the user needs to first connect the modified bus module 200' to the first line wire 104 via the lug connector 214 as set forth above. The user can then provide power to the first, second, and third load-side circuits 114, 118, 122 using the first line-side circuit 102 by simply inserting the male, line-side terminals 412, 420, 428 into the respective female terminals 258, 260, 262 of modified bus module 200'. More specifically, the second power distribution scheme is implemented by connecting the modified bus module 200' to the fuse holder 400 in the following manner: the first male, line-side terminal 412 of the fuse holder 400 is inserted into the first female terminal 258 within the first sleeve 292 of the modified bus module 200' for electrical connection thereto; the second male, line-side terminal 420 of the fuse holder 400 is inserted into the second female terminal 260 within the second sleeve 294 of the modified bus module 200' for electrical connection thereto; and the third male, line-side terminal 428 of the fuse holder 400 is inserted into the third female terminal 264 within the third sleeve 296 of the modified bus module 200' for electrical connection thereto. As such, the fourth male, line-side terminal 436 of the fuse holder 400 remains accessible for insertion into a suitable female connector terminal 500 attached to the second line wire 108 and the second line-side circuit 106 for electrical connection thereto.

In this manner, power from the first line-side circuit 102 can be supplied to the first, second, and third load-side circuits 114, 118, 122 across the first, second, and third load-side terminals 414, 422, 430 (with each of these load-side circuits 114, 118, 122 being protected from overcurrent by a respective one of the fuses carried by the first, second, and third fuse sockets 404, 406, 408 of the fuse holder 400), while power from the second line-side circuit 106 can be supplied to the fourth load-side circuit 126 across the fourth load-side terminal 438 (with the fourth load-side circuit 126 being protected from overcurrent by the fuse carried by the fourth fuse socket 410 of the fuse holder 400).

While not illustrated in the Figs., it is further contemplated that the bus module 200 can be converted into a third modified configuration to implement a third power distribution scheme in which: the first load-side circuit 114 is powered by the third line-side circuit 110; the second and third load-side circuits 118, 122 are powered by the first line-side circuit 102; and the fourth load-side circuit 126 is powered by the second-line side circuit 106. To convert the bus module 200 into its third modified configuration, the user first converts the bus module 200 from its standard configuration into its first modified configuration as set forth above. Then, on the modified bus module 200', the user detaches the left flank region 284 from the hub region 282 at the first web region 288 in the same manner that the right flank region 286 was detached from the hub region 282 at the second web region 290 above (i.e., by cutting the first web region 288 and attaching a cap (like the cap 456 of FIG. 13) to the first web region 288 to shield the resulting cut end of the first lower lateral base segment 226).

When the bus module 200 in its third configuration is connected to the second and third male, line-side terminals 420, 428 of the fuse holder 400, the first and fourth male, line-side terminals 412, 436 remain accessible for the connection of female lug connectors of the third and second line wires 112, 108, respectively, in order to provide power to the first and fourth load-side circuits 114, 126, respectively, using the third and second line-side circuits 110, 106, respectively. Like in the first and second power distribution schemes set forth above, the second and third load-side circuits 118, 122 would, in the case of the third power distribution scheme, still be powered by the first line-side circuit 102 across the first line wire 104 and the associated fuses inserted into the second and third fuse sockets 406, 408, respectively, of the now twice modified bus module 200.

The above-described embodiments facilitate providing a power distribution system with a bus module 200 and/or a fuse holder 400 that allow a user to more easily, effectively, and safely choose between a number of predetermined power distribution schemes (i.e., to choose which one or more load-side circuits are to be powered by which one or more line-side circuits across which one or more fuses). Suitably, while the bus module 200 is described herein as being configured for modification to suit its connection with a desired number of the line-side terminals of the fuse holder 400 to facilitate implementing the various power distribution schemes set forth herein, it is contemplated that the power distribution system 100 could also be provided with a load-side bus module configurable in a manner similar to that of the bus module 200 set forth herein to facilitate connection of the load-side bus module to a desired number of load-side terminals of the fuse holder 400, thereby facilitating the implementation of an even broader set of power distribution schemes.

The benefits and advantages of the inventive concepts are now believed to have been amply illustrated in relation to the exemplary embodiments disclosed.

An embodiment of a power distribution system has been disclosed. The power distribution system includes a fuse holder having a plurality of line-side terminals. The power distribution system also includes a bus module having an enclosure and a conductor disposed within the enclosure. The conductor includes a comb-type bus bar having a base member and a plurality of branch members extending from the base member and each embodying a terminal connectable to one of the line-side terminals of the fuse holder.

Optionally, the fuse holder may have a plurality of fuse sockets each sized to receive an automotive-type fuse. Also, each of the line-side terminals of the fuse holder may be of the male type, and each of the terminals of the bus module may be of the female type. Furthermore, each of the female terminals may have a front opening, and the bus module may include an enclosure in which the bus bar is disposed such that the front openings of the female terminals are accessible from outside of the enclosure. The enclosure may have at least one of an alignment feature and a weakened area that facilitates cutting removal of at least one of the female terminals from the bus bar. Also, the bus module may include a cap attachable to the enclosure in place of a removed female terminal. Additionally, the bus module may be connectable to the fuse holder by pushing-type connection and pulling-type disconnection.

An embodiment of a bus module for a power distribution system has also been disclosed. The bus module includes a current input terminal, and a comb-type bus bar electrically connected to the input terminal. The bus bar has a base member and a plurality of branch members extending from the base member, wherein each of the branch members embodies a female terminal of the bus bar.

Optionally, the input terminal may be a lug connector formed separately from and coupled to the bus bar. Also, the branch members may be integrally formed with the base member. Furthermore, the branch members may be substantially evenly spaced apart from one another. Additionally, the base member may have an undulating profile. Also, each of the female terminals may have a front opening, and the bus module may include an enclosure in which the bus bar is disposed such that the front openings of the female terminals are accessible from outside of the enclosure. Furthermore, the enclosure may include at least one of an alignment feature and a weakened area that facilitates cutting removal of at least one of the female terminals from the bus bar. Additionally, the bus module may include a cap attachable to the enclosure in place of a removed female terminal.

An embodiment of a fuse holder for a power distribution system has also been disclosed. The fuse holder includes a housing, a plurality of fuse sockets mounted within the housing, and a plurality of male, line-side terminals each electrically connected to one of the fuse sockets.

Optionally, each of the fuse sockets may have a fuse clip such that one of the line-side terminals is integrally molded with each of the fuse clips. Also, each of the fuse sockets may be sized to receive an automotive-type fuse. Furthermore, each of the fuse sockets may have a pair of fuse clips each sized to receive a blade of the automotive-type fuse. Additionally, the fuse holder may include a plurality of load-side terminals each electrically connected to one of the fuse sockets such that each of the fuse sockets has one associated load-side terminal and one associated line-side terminal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A bus module for a power distribution system, the bus module comprising:
    a current input terminal;
    a comb-type bus bar electrically connected to the input terminal and comprising a base member and a plurality of branch members extending from the base member, wherein each of the plurality of branch members embodies a female terminal, wherein each of the female terminals comprises a front opening;
    an enclosure in which the bus bar is disposed such that the front openings of the female terminals are accessible from outside of the enclosure, wherein the enclosure comprises at least one of an alignment feature and a weakened area that facilitates cutting or removal of at least one of the female terminals from the bus bar; and
    a cap attachable to the enclosure in place of a removed female terminal.

2. The bus module of claim 1, wherein the current input terminal is a lug connector formed separately from and coupled to the comb-type bus bar.

3. The bus module of claim 1, wherein the plurality of branch members are integrally formed with the base member.

4. The bus module of claim 3, wherein the plurality of branch members are substantially evenly spaced apart from one another.

5. The bus module of claim 4, wherein the base member has an undulating profile.

* * * * *